3,077,427
NEW VINYL LATEX ADHESIVES AND LAMINATES MADE THEREFROM

Charles L. Hamermesh, Canoga Park, Calif., and Richard Bolstad and Guy J. Del Franco, Brooklyn, N.Y., and Norman G. Gaylord, New Providence, N.J., assignors to Interchemical Corporation, New York, N.Y., a corporation of Ohio
No Drawing. Filed Sept. 8, 1960, Ser. No. 54,590
10 Claims. (Cl. 154—46)

This invention relates to vinyl latex adhesives and to laminates made therefrom. More particularly it relates to latex adhesives comprising copolymers of vinyl acetate with minor amounts of a monomer containing carboxyl groups and polyfunctional imine compounds and to cellulosic fibrous laminates made therefrom.

These latices are especially useful as adhesives for making paper-to-paper or paper-to-foil laminates which have superior resistance to delamination when immersed in water and subjected to stress.

Vinyl acetate homopolymer latices have poor water resistance, so that when they are used as laminating adhesives, immersion in water at room temperature spoils the bond. Attempts have been made to improve their water-resistance by the use of thermosetting resins such as urea, formaldehyde, melamines, and phenolics, or by the action of dialdehydes.

It has now been found that latices of vinyl acetate can be modified to produce bonding materials of superior water resistance by copolymerizing the vinyl acetate with an aliphatic alpha, beta ethylenically unsaturated carboxylic acid such as acrylic acid, methacrylic acid, crotonic acid, isocrotonic acid, angelic acid, tiglic acid, maleic acid, fumaric acid, citraconic acid, or mesaconic acid and blending a polyfunctional imine with the latex. Preparation of the copolymers is in some cases facilitated by incorporating the methyl or ethyl ester of one of the acids mentioned above in the monomer mixture. The use of the anionic emulsifying agent Triton X–200 (alkyl aryl polyether alcohol) and Tergitol #4 (sodium salt of a sulfated high molecular weight alcohol) resulted in stable latices. The acid monomer content is preferably less than 10%. The use of a stabilizer such as polyvinyl alcohol or hydroxyethyl cellulose facilitated the preparation of stable latices having 55% solids. Various vinyl acetate latices were tested with and without the addition of polyfunctional imine compounds such as those having the structure

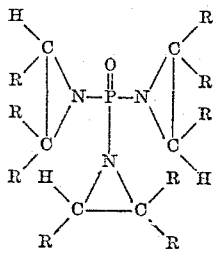

wherein R is a member selected from the group consisting of H, $CH_3$, and $C_2H_5$. I have found tris-(2-methyl-1-aziridinyl) phosphine oxide, for example, to be especially effective in the present invention. Also tested were a commercially available crosslinking polyvinyl acetate latex system, ordinary commercial polyvinyl acetate latex, a similar experimental homopolymer, the latices of this invention, and also an experimental emulsion copolymer of vinyl acetate and methyl methacrylate (90:10) free from carboxyl groups.

Paper-to-paper laminates were made with the latices and immersed under load in water at room temperature. After 17 hours the distance of creep of the bond determined the degree of failure. Only the combination of carboxyl-containing latex and the polyfunctional imine were water resistant.

The test laminations were prepared by drawing down the binder with a wire-wound draw-down rod on a sheet of paper tube winding stock (a solid blended sulphate can stock). An uncoated sheet of the same paper was laid over the so-coated paper and the combination thus formed allowed to stand under a heavy weight for 2 to 2½ hours. Sections of the laminate thus formed were removed after various periods of air drying and were then attached to a weight and suspended with the bond totally immersed in water at room temperature. After 17 hours, the degree of creep of the bond was measured. In order to confirm the validity of tests made with a solids content ranging from 40% to 55% of polymers, those of 55% solids content were reduced to 40%. Paper laminates made from the 40% material gave results similar to those at 55%.

The weight attached to the laminates had to be selected in such a way that differences of strength were shown in the series of tests. If too light a weight was used, no differences could be observed. Similarly with too heavy a weight, all samples failed too quickly for appraisal.

The results for Examples 1 and 2 are shown in Table I wherein MAPO represents tris-(2-methyl-1-aziridinyl) phosphine oxide in the amount of 1.1 to 1.5 g. in 100 g. of the wet latex.

TABLE I

| Latex Composition | Creep Test After 17 Hours' Immersion in Water at Room Temperature |
|---|---|
| 1. Experimental latex—90% vinyl acetate; 10 methylmethacrylate: | |
| (a) without MAPO | all samples failed even after air-drying for 9 days. |
| (b) with MAPO | |
| 2. Example 1 (55% solids): | |
| (a) without MAPO | Do. |
| (b) with MAPO | after 2-hour air drying bond creep of 3/16 in. After 24-hour air drying bond creep 1/16 in. |
| 3. Example 2 (40% solids): | |
| (a) without MAPO | all samples failed even after air drying for 9 hours. |
| (b) with MAPO | after 4-day air drying bond creep of 1/16 in. |
| 4. Experimental vinyl acetate homopolymer latex without acrylates: | |
| (a) without MAPO | |
| (b) with MAPO | all samples failed even after air drying for 9 days. |
| (c) reduced to 40% solids, MAPO present | |
| 5. Commercially available vinyl acetate latex: | |
| (a) without MAPO | |
| (b) with MAPO | Do. |
| (c) reduced to 40% solids, MAPO is present | |
| 6. Commercially available vinyl latex: | |
| (a) without MAPO | |
| (b) with MAPO | Do. |
| (c) reduced to 40% solids, MAPO is present | |
| 7. Commercially available vinyl acetate latex cross-linked with the manufacturer's crossbinder | Do. |

In Table I, "samples failed" indicates extensive delamination. Only the latices of this invention blended with the polyfunctional imine withstood the delamination test. The latex listed as item 4 in Table I appeared, from other tests made with it, to have the characteristic properties of commercial vinyl acetate latices. A detailed description of its preparation is given following Example 2.

The examples are given to illustrate this invention, but not as limitations.

Example 1

1350 g. water, 12.3 g. Duponol C (sodium lauryl sulfate), 18.9% g. (solids) Tergitol #4,

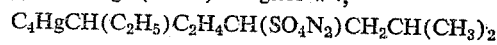

24.9 g. Cellosize DP–09 (hydroxy ethyl cellulose), 24.9 g. sodium bicarbonate, and 3.3 g. benzoyl peroxide were stirred together in a 3-necked flask fitted with a stirrer, thermometer, and reflux condenser. A mixture consisting of 371 g. vinyl acetate monomer, 20.6 g. methyl methacrylate monomer, and 20.6 g. methacrylic acid monomer was slowly added. The contents of the flask were then heated to reflux (67° C.) and 6.6 g. ammonium persulfate added. The temperature was now raised to 75° C. and there was added slowly enough to maintain a temperature of 75 to 80° C., a mixture of 1114 g. vinyl acetate monomer, 61.9 g. methyl methacrylate monomer, and 61.9 g. methacrylic acid monomer. After the addition, heating was continued until the temperature reached 95.5° C. The reaction was then completed by adding 3.3 g. ammonium persulfate and refluxing for another half hour. The latex contained 55% solids.

*Example 2*

582 g. water, 6 g. (solids) Tergitol #4, 6 g. sodium bicarbonate, 90 g. vinyl acetate, 5 g. methyl methacrylate, and 5 g. methacrylic acid were heated to reflux temperature (67° C.) and then 1.6 g. ammonium persulfate and 0.8 g. benzoyl peroxide were added. An exotherm developed in about 15 minutes. 30 minutes later 202.5 g. vinyl acetate, 11.25 g. methyl methacrylate, 11.25 g. methacrylic acid, and 2.25 g. Duponol (sodium lauryl sulfate) were added. 40 minutes later 67.5 g. vinyl acetate, 3.75 g. methyl methacrylate, 3.75 g. methacrylic acid, and 0.75 g. Duponol were added. Refluxing was continued half an hour longer. 40% solids were present.

To make the adhesives of this invention 100 parts of the latices are blended with ½ to 10 parts of tris-(2-methyl-1-aziridinyl) phosphine oxide.

EXPERIMENTAL VINYL ACETATE HOMOPOLYMER LATEX WITHOUT ACRYLATES 1.29 g. Elvanol 51–05 (polyvinyl alcohol), 0.322 g. Elvanol 50–42 (polyvinyl alcohol) and 0.268 g. Aerosol OT (dioctyl ester of sodium sulfosuccinic acid) were dissolved in 44.0 g. of water. This solution, together with 0.107 g. sodium bicarbonate, 0.054 g. benzoyl peroxide, and 5.38 g. vinyl acetate was put into a 3-necked round-bottomed flask fitted with stirrer, thermometer, reflux condenser, dropping funnel, and heating mantle. The charge was heated to reflux temperature (64–66° C.) and allowed to "exotherm" up to 75° C. 48.42 g. vinyl acetate was then added dropwise over a 2-hour period, the temperature being maintained at 75–80° C., after which 0.054 g. ammonium persulfate was added and the temperature raised to 90°. The temperature was maintained there for 30 minutes. The resulting latex was cooled and strained through a single layer of cheesecloth. It contained 55% solids.

*Example 3*

The method of Example 1 was repeated but with diethyl maleate instead of methyl methacrylate.

*Example 4*

The method of Example 1 was repeated but this time the monomers consisted of 95 parts by weight of vinyl acetate and 5 parts by weight of crotonic acid.

*Example 5*

The method of Example 1 was repeated but the monomers in this case consisted of 95 parts by weight of vinyl acetate and 5 parts by weight of fumaric acid.

*Example 6*

The method of Example 1 was repeated but the monomers here consisted of 90 parts by weight of vinyl acetate, 5 parts by weight of methyl methacrylate, and 5 parts by weight of acrylic acid.

The latices of Examples 3, 4, 5 and 6, when combined with the polyfunctional imine were comparable with the latices of Examples 1 and 2 in their effectiveness as adhesives for laminates. The solids content of these four latices was 54–55%.

All the adhesives, when formulated with tris-(2-methyl-1-aziridinyl) phosphine oxide and used to form laminates cured 1 to 30 minutes at about 105° C. to 145° C., functioned well, displaying excellent resistance to water and to heat.

What is claimed is:

1. A process for preparing a bonding agent for bonding cellulosic fibrous sheets comprising (1) copolymerizing a major quantity of vinyl acetate with a minor amount of a copolymerizable aliphatic alpha, beta-ethylenically unsaturated carboxylic acid in water containing suitable catalysts and dispersing agents and (2) blending the latex so formed with minor amounts of tris-(2-methyl-1-aziridinyl) phosphine oxide.

2. A process for preparing a bonding agent for bonding cellulosic fibrous sheets comprising (1) copolymerizing 85 to 96 parts of vinyl acetate, 4 to 11 parts of a copolymerizable aliphatic alpha, beta-ethylenically unsaturated carboxylic acid and 0 to 5 parts of a copolymerizable alkyl ester of such an acid in which ester the alkyl member is selected from the ground consisting of ethyl and methyl radicals, said copolymerization being conducted in water containing 0.1 to 0.5 part of benzoyl peroxide, 0.3–2.0 parts of ammonium persulfate, 75–300 parts of water, and dispersing agents and (2) blending 100 parts of the resulting latex with about ½ to 10 parts of tris-(2-methyl-1-aziridinyl) phosphine oxide.

3. A laminate comprising at least one cellulosic fibrous sheet element and at least one similar sheet element attached thereto, said elements having been bonded by means of the bonding agent described in claim 1, said bonding agent having been cured for 10 to 100 hours at about 20° to 30° C.

4. A laminate comprising at least one cellulosic fibrous sheet element and at least one similar sheet element attached thereto, said elements having been bonded by means of the bonding agent described in claim 2, said bonding agent having been cured for 10 to 100 hours at about 20 to about 30° C.

5. The laminate described in claim 3 but the curing cycle having been 1 to 30 minutes of heating at a temperature of from about 105° C. to about 145° C.

6. The laminate described in claim 4 but the curing cycle having been 1 to 30 minutes of heating at a temperature of from about 105° C. to about 145° C.

7. A process for preparing a cellulosic fibrous sheet laminate comprising treating at least one cellulosic fibrous sheet element with the bonding agent prepared by the method of claim 1, applying at least one similar element thereto and curing the resulting laminate for about 10 to 100 hours at a temperature of about 20° C. to about 30° C.

8. The process described in claim 7 but using the bonding agent prepared by the method of claim 2.

9. The process described in claim 7 but using a curing cycle of 1 to 30 minutes of heating at from about 105° C. to about 145° C.

10. The process described in claim 8 but using a curing cycle of 1 to 30 minutes of heating at from about 105° C. to about 145° C.

References Cited in the file of this patent
UNITED STATES PATENTS 2,915,480     Reeves et al. _____ Dec. 1, 1959